United States Patent
Iwamura et al.

(10) Patent No.: US 8,750,142 B2
(45) Date of Patent: Jun. 10, 2014

(54) USER EQUIPMENT

(75) Inventors: Mikio Iwamura, Yokohama (JP); Minami Ishii, Yokohama (JP)

(73) Assignee: NTT DoCoMo, Inc., Tokyo (JP)

( * ) Notice: Subject to any disclaimer, the term of this patent is extended or adjusted under 35 U.S.C. 154(b) by 367 days.

(21) Appl. No.: 12/677,128

(22) PCT Filed: Sep. 17, 2008

(86) PCT No.: PCT/JP2008/066740
§ 371 (c)(1),
(2), (4) Date: Mar. 9, 2010

(87) PCT Pub. No.: WO2009/038077
PCT Pub. Date: Mar. 26, 2009

(65) Prior Publication Data
US 2010/0195524 A1    Aug. 5, 2010

(30) Foreign Application Priority Data
Sep. 21, 2007   (JP) ................................ 2007-245927

(51) Int. Cl.
*H04L 12/28*    (2006.01)
*H04W 76/04*   (2009.01)

(52) U.S. Cl.
CPC .................................. *H04W 76/048* (2013.01)
USPC ............................ 370/252; 370/311; 455/446

(58) Field of Classification Search
CPC .................................................. H04W 76/048
USPC ................................ 370/230, 312; 455/446
See application file for complete search history.

(56) References Cited

U.S. PATENT DOCUMENTS

| 2005/0153700 A1* | 7/2005 | Farnsworth et al. | 455/446 |
| 2005/0176474 A1* | 8/2005 | Lee et al. | 455/574 |
| 2010/0255859 A1* | 10/2010 | Park et al. | 455/458 |

OTHER PUBLICATIONS

International Search Report w/translation from PCT/JP2008/066740 dated Nov. 11, 2008 (3 pages).
Written Opinion from PCT/JP2008/066740 dated Nov. 11, 2008 (3 pages).
3GPP TSG-RAN WG2 #58bis; R2-072736; "Discussion on BCCH Update"; LG Electronics Inc.; Orlando, USA; Jun. 25-29, 2007 (3 pages).
3GPP TSG-RAN WG2 Meeting #59; R2-073235; "BCCH updates"; Ericsson; Athens, Greece; Aug. 20-24, 2007 (4 pages).
3GPP TSG-RAN2 Meeting #59; R2-073304; "System information change notification"; Samsung; Athens, Greece; Aug. 20-24, 2007 (4 pages).
3GPP TS 36.300 v8.1.0; "Evolved Universal Terrestrial Radio Access (E-UTRA) and Evolved Universal Terrestrial Radio Access Network (E-UTRAN)"; Jun. 2007 (106 pages).
3GPP TR 25.814 v7.0.0; "Physical layer aspects for evolved Universal Terrestrial Radio Access (UTRA)"; Jun. 2006 (126 pages).

* cited by examiner

*Primary Examiner* — Wanda Z Russell
(74) *Attorney, Agent, or Firm* — Osha Liang LLP

(57) ABSTRACT

A disclosed user equipment terminal capable of transmitting and receiving broadcast information based on broadcast information change notification notified by a base station apparatus, including a determination unit receiving a signal transmitted from the base station apparatus and determining whether the broadcast information has been changed based on the signal and a broadcast information re-reception unit performing re-reception of the broadcast information when the broadcast information has been changed based on a result of determination by the determination unit. Further, in the user equipment terminal, after a predetermined re-reception process suspension period has passed, the broadcast information re-reception unit performs the re-reception of the broadcast information.

11 Claims, 11 Drawing Sheets

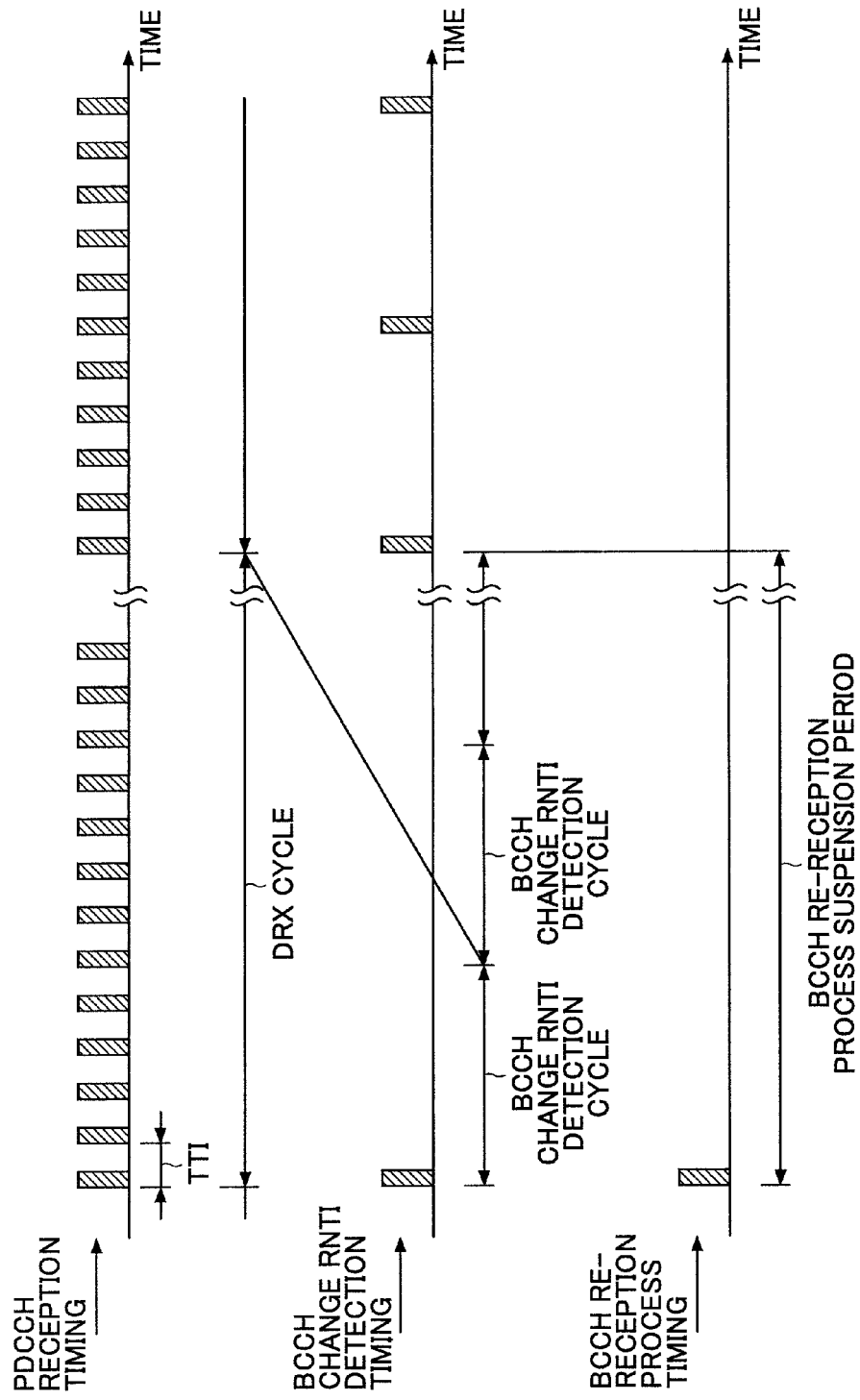

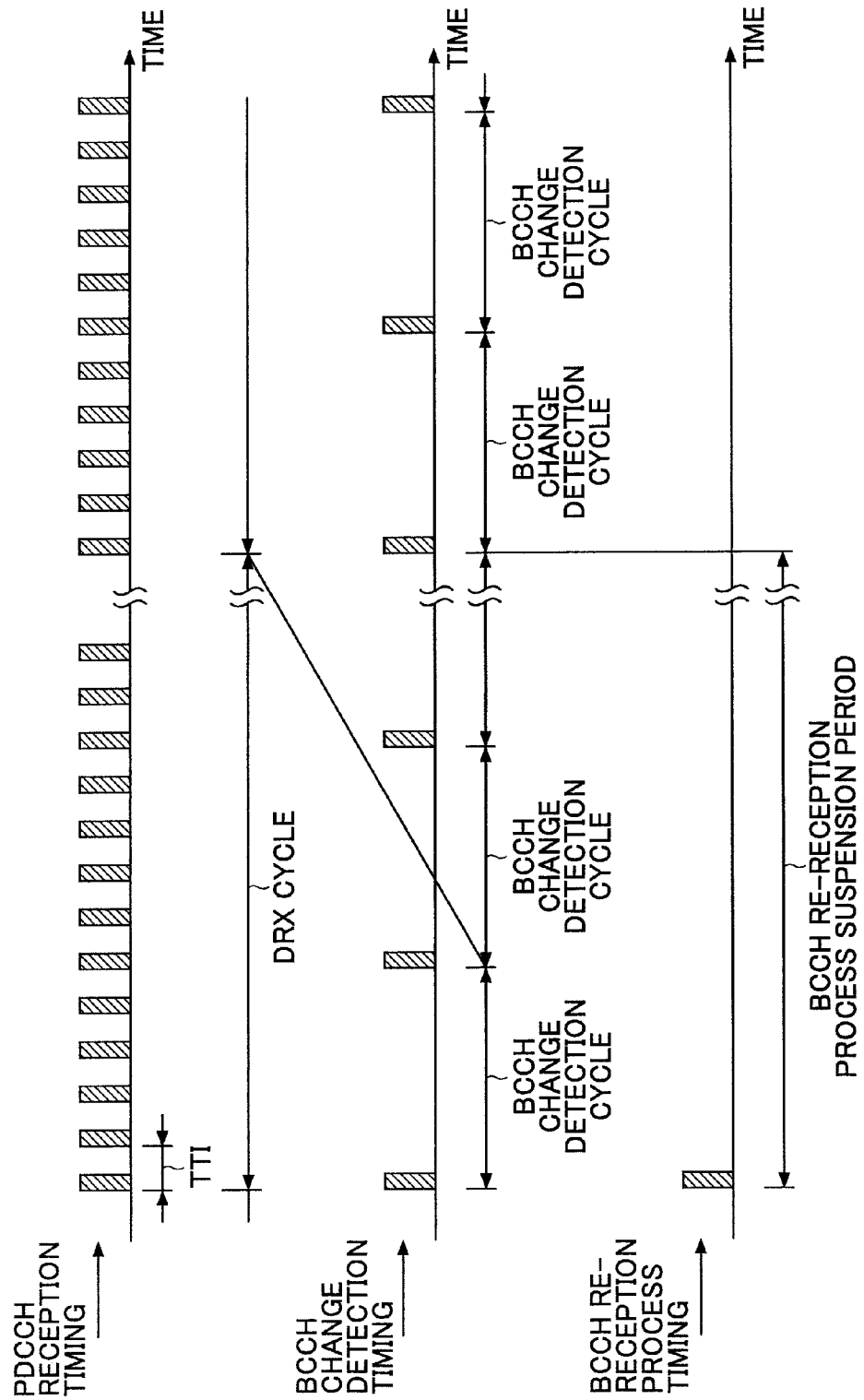

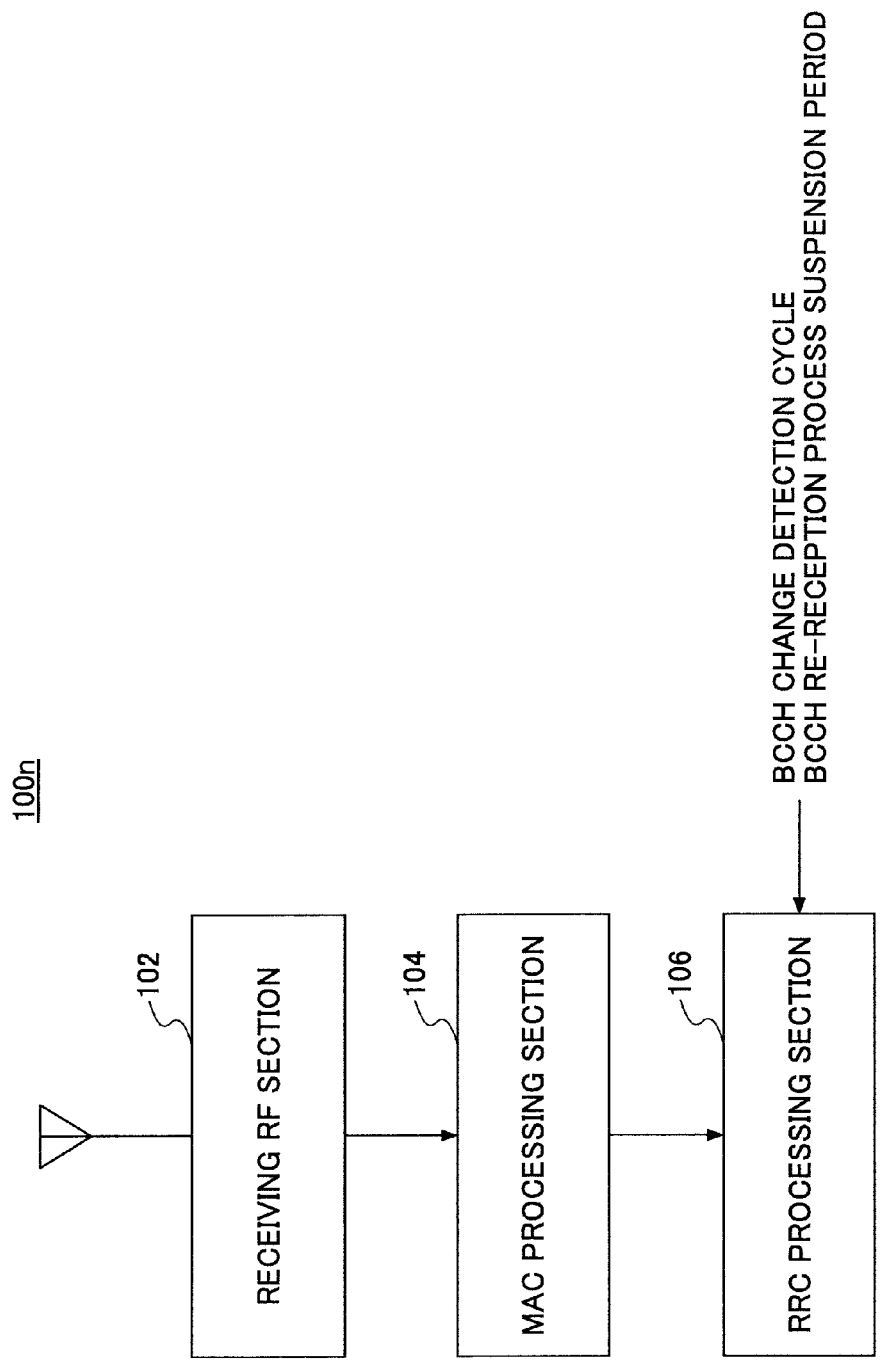

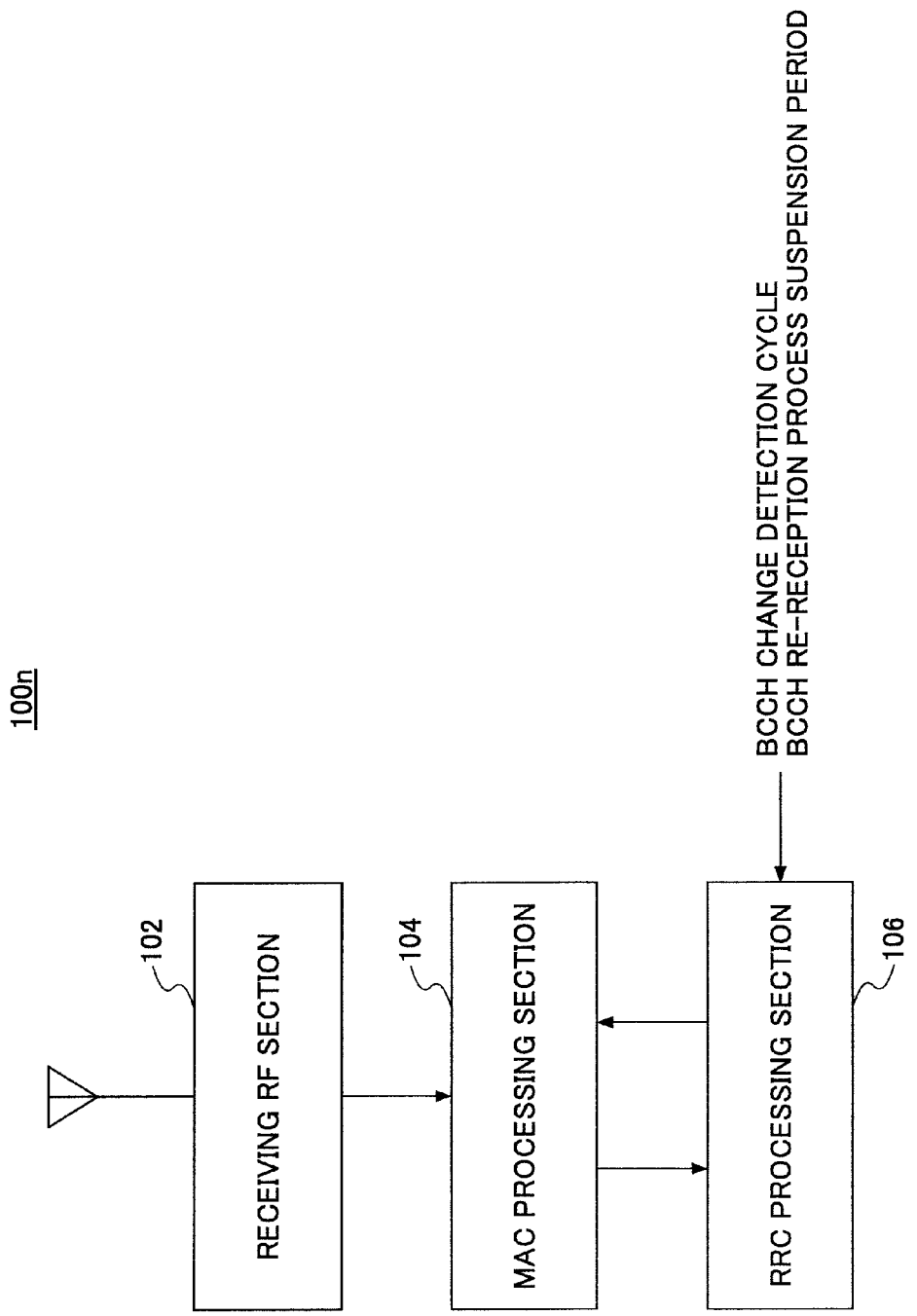

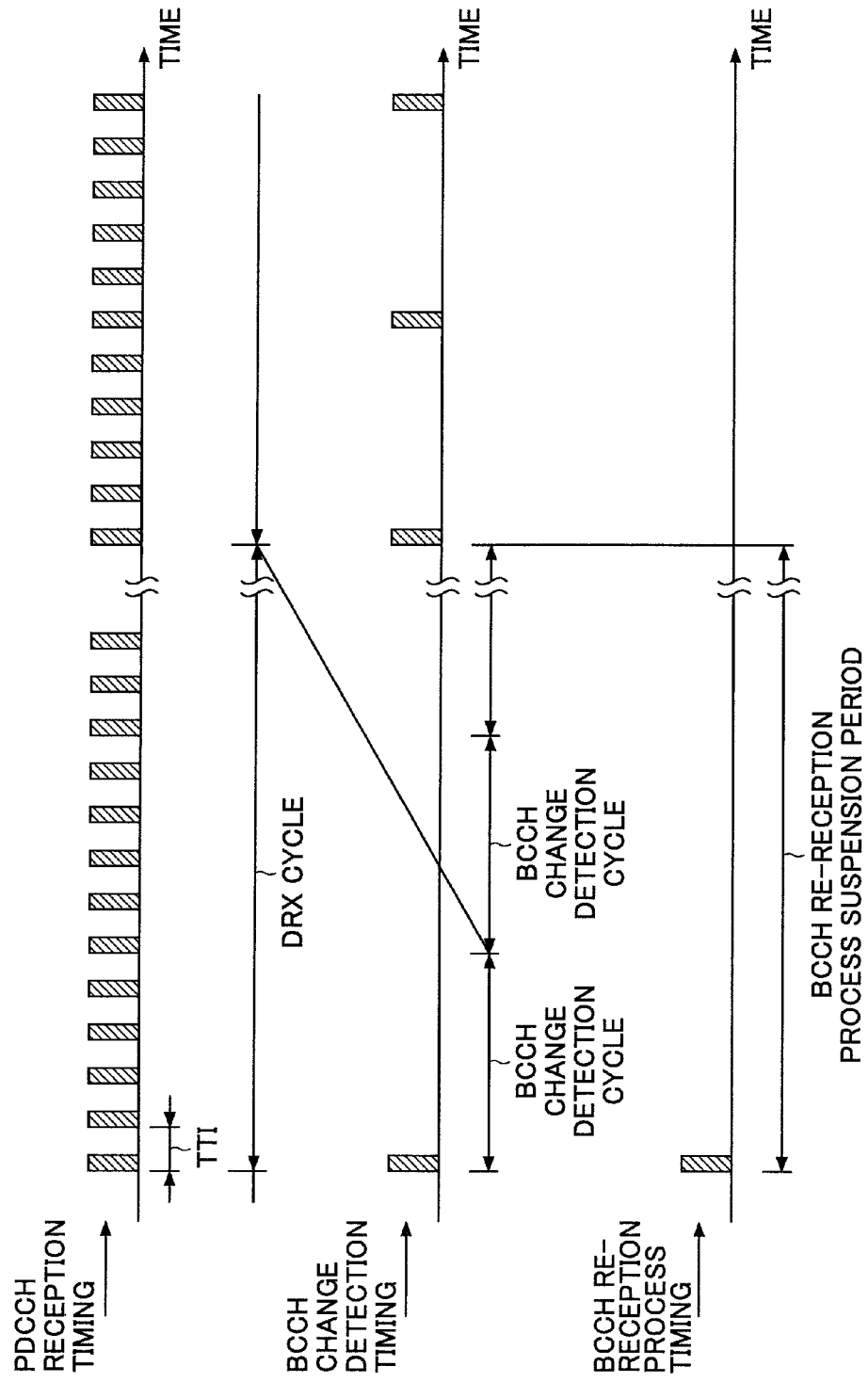

USER EQUIPMENT

TECHNICAL FIELD

The present invention generally relates to a radio communication system, and more particularly to user equipment.

BACKGROUND ART

As a next-generation communication system of the W-CDMA (Wideband Code Division Multiple Access) system or the HSDPA (High Speed Downlink Packet Access) system (collectively called UMTS (Universal Mobile Telecommunications System)), an LTE (Long Term Evolution) system has been studied by 3GPP ($3^{rd}$ Generation Partnership Project) which is a standards body of the UMTS. More specifically, in the LTE system as a radio access system, an OFDM (Orthogonal Frequency Division Multiplexing) scheme and an SC-FDMA (Single-Carrier Frequency Division Multiple Access) scheme have been studied to be applied to the downlink communications system and the uplink communications system, respectively (see, for example, 3GPP TR 25.814 (V7.0.0), "Physical Layer Aspects for Evolved UTRA," June 2006).

A base station apparatus broadcasts broadcast information items (hereinafter may be referred to as broadcast information) indicating such as a configuration of a common channel, restriction information, measurement control information, neighboring cell information and the like using a Broadcast Control Channel (BCCH). Further, there may arise necessity for changing the contents of the broadcast information. For example, if congestion in the network is detected, the contents of the restriction information may be changed (updated); and if a new cell is added to coverage cells of the base station apparatus, the neighboring cell information may be changed. Further, an initial transmission power value of a Random Access Channel (RACH) may vary depending on a measured uplink interference amount.

In order to change the contents of the broadcast information, the changed contents of the broadcast information are required to be reported to user equipment (hereinafter referred to as a user equipment (UE) terminal(s)). In this case, for example, a signaling such as a Paging Channel (PCH) may be reported through a network to the base station apparatus; then, the base station apparatus reports that the broadcast information has been changed to a user equipment (UE) terminal by signaling. This signaling is called Broadcast Control Channel Change Notification (BCCH Change Notification) or System Information Change Notification. Upon receiving the BCCH Change Notification from the base station apparatus, the user equipment (UE) terminal performs a re-reception process of the changed broadcast information.

While waiting for an incoming call, i.e., in an idle (RRC_IDLE) mode, a user equipment (UE) terminal monitors the Paging Channel (PCH) at a predetermined timing assigned to a group to which the user equipment (UE) belongs. In other words, reception timings of the paging differ depending on the groups to which the user equipment (UE) terminals belong. When there is an incoming call to a user equipment (UE) terminal belonging to a group, the base station apparatus transmits signaling using a Paging-Radio Network Temporary Identity (P-RNTI) in a Physical Downlink Control Channel (PDCCH). The Physical Downlink Control Channel (PDCCH) includes information items indicating positions of resource blocks for a Physical Downlink Shared Channel (PDSCH), Transport Block format (TB format) and the like. The Physical Downlink Control Channel (PDCCH) may also be called an L1/L2 Control Channel (L1/L2 CCH). Specifically, the Physical Downlink Shared Channel (PDSCH) includes the user equipment identity (UE ID) of the paging user equipment (UE) terminal.

As shown in FIG. 1, the user equipment (UE) terminal checks (determines) whether there is the Physical Downlink Control Channel (PDCCH) addressed to the P-RTNI at a Discontinuous Reception (DRX) timing of the user equipment (UE) terminal. When determining that there is the Physical Downlink Control Channel (PDCCH) addressed to the P-RTNI, the user equipment (UE) terminal further receives the Physical Downlink Shared Channel (PDSCH) to determine whether there is the user equipment identity (UE ID) of the user equipment (UE) terminal in the received Physical Downlink Shared Channel (PDSCH); and when determining that there is the user equipment identity (UE ID) of the user equipment (UE) terminal, the user equipment (UE) terminal determines that there is an incoming call to the user equipment (UE) terminal and starts a connection procedure.

On the other hand, when there is no paging user equipment (UE) terminal, neither the Physical Downlink Control Channel (PDCCH) nor the Physical Downlink Shared Channel (PDSCH) is transmitted and the resources for those channels may be used for data transmission and the like.

When a user equipment (UE) terminal performs a cell re-selection and moves into a new cell to wait for an incoming call in the new cell, the user equipment (UE) terminal always receives all broadcast information in the new cell. Therefore, as long as the broadcast information has been changed before the user equipment (UE) terminal moves into a new cell, the user equipment (UE) terminal always receives all broadcast information in the new cell, and the change of the broadcast information is reflected. On the other hand, however, in a case where the broadcast information is changed while a user equipment (UE) terminal is waiting for an incoming call, the user equipment (UE) terminal cannot recognize the change of the broadcast information unless (1) the change of the broadcast information is reported to the user equipment (UE) terminal or (2) the user equipment (UE) terminal periodically performs the re-reception processes of the broadcast information (e.g., unless the user equipment (UE) terminal recognizes a broadcasted Value Tag). From the viewpoint of saving battery power, the former case (1) is preferable rather than the latter case (2) because in the latter case (2), the battery of the user equipment (UE) terminal is wasted by periodically performing the re-reception processes. A user equipment (UE) terminal performs a reception process to receive paging data at predetermined timings for paging only. Because of this feature, from the viewpoint of saving battery power, it is preferable that the change of the broadcast information is notified at the predetermined timing for paging.

Due to the above mentioned features, as a method of notifying the change of the broadcast information to the user equipment (UE) terminal, the following methods (1) through (4) have been proposed (see, for example, 3GPP R2-073235, August 2007, and 3GPP R2-073304, August 2007).

(1): A method of transmitting the Physical Downlink Control Channel (PDCCH) to the P-RNTI so that the BCCH Change Notification is performed by using the Physical Downlink Control Channel (PDCCH).

(2): A method of transmitting the Physical Downlink Control Channel (PDCCH) to the P-RNTI so that the BCCH Change Notification is performed by using the Physical Downlink Shared Channel (PDSCH) addressed by the Physical Downlink Control Channel (PDCCH).

(3): A method of transmitting the Physical Downlink Control Channel (PDCCH) to a Broadcast Control Channelchange-Radio Network Temporary ID (BCCH-change-RNTI) so that the BCCH Change Notification is performed by using the Physical Downlink Control Channel (PDCCH).

(4): A method of transmitting the Physical Downlink Control Channel (PDCCH) to the Broadcast Control Channel-change-Radio Network Temporary ID (BCCH-change-RNTI) so that the BCCH Change Notification is performed by using the Physical Downlink Shared Channel (PDSCH) addressed by the Physical Downlink Control Channel (PDCCH).

In any of the above methods, the change of the broadcast information is required to be notified to all the user equipment (UE) terminals waiting in the cell. Therefore, the signaling (i.e., the BCCH Change Notification) is repeatedly transmitted. For example, by considering the possibility that a user equipment (UE) terminal fails to receive the signaling, the signaling is required to be repeatedly notified during a period about two or three times longer than a Discontinuous Reception (DRX) cycle.

DISCLOSURE OF INVENTION

Problems to be Solved by the Invention

As a method of notifying the change of the broadcast information to the user equipment (UE) terminal which is in communication (i.e., in an active mode), the methods described above may also be applied to the user equipment (UE) terminal which is in communication. While being in the active (RRC_CONNECTED) mode, a user equipment (UE) terminal can perform the Discontinuous Reception (DRX) in accordance with the activity of the transmission/receiving data during the active mode. In the Discontinuous Reception (DRX), the user equipment (UE) terminal discontinuously receives the Physical Downlink Control Channel (PDCCH). When there is no transmission data assigned in uplink or downlink using the Physical Downlink Control Channel (PDCCH), a reception process of the Physical Downlink Control Channel (PDCCH) is suspended until the next reception timing of the next Discontinuous Reception (DRX) cycle. By applying the Discontinuous Reception (DRX) in the active mode (upon radio bearer establishment), battery power can be saved while reducing transmission delay. Therefore, herein, the status of active mode includes status of the Discontinuous Reception (DRX).

The timings when user equipment (UE) terminals start up to receive the Physical Downlink Control Channel (PDCCH) differ depending on the user equipment (UE) terminals. On the other hand, the base station apparatus is required to transmit signaling to repeatedly perform broadcast information change notification for a certain period of time in order to notify all the user equipment (UE) terminals existing in the area covered by the cell of change of the broadcast information. The user equipment (UE) terminals include the user equipment (UE) terminal(s) in Discontinuous Reception (DRX). The timings of the Discontinuous Reception (DRX) differ depending on the user equipment (UE) terminals. Because of this feature, typically, the notification of the change of the broadcast information is required to be repeatedly transmitted for a certain period of time in every Transmission Time Interval (TTI). Further, in view of possibility that some user equipment (UE) terminals may fail to receive the notification within one notification, it is required to repeatedly transmit the notification for a certain long period (e.g., an integral multiple of the maximum discontinuous reception cycle provided by the system).

A user equipment (UE) terminal in the Discontinuous Reception (DRX) mode receives the signaling at the timing when the user equipment (UE) terminal performs the reception process. Further, upon being notified that the broadcast information has been changed, the user equipment (UE) terminal performs the re-reception process of the broadcast information.

On the other hand, a user equipment (UE) terminal which is in the active mode but is not in the Discontinuous Reception (DRX) mode (i.e., actively transmitting/receiving data) receives all the signaling transmitted in every TTI. However, from the viewpoint of saving battery power, it is not preferable to receive the notification of the change of the broadcast information every TTI.

Further, when the change of the broadcast information is notified by the signaling every TTI, the user equipment terminal (UE) may become unclear as to when the change has been made.

The present invention is made to overcome at least one of the above problems and may provide a user equipment (UE) terminal capable of reducing the battery consumption when the change of the broadcast control information is notified.

Means for Solving the Problems

According to an aspect of the present invention, there is provided a user equipment terminal transmitting and receiving broadcast information based on broadcast information change notification notified by a base station apparatus. The user equipment terminal includes:

a determination unit receiving a signal transmitted from the base station apparatus and determining whether the broadcast information has been changed based on the signal; and a broadcast information re-reception unit, when the broadcast information has been changed based on a result of determination by the determination unit, performing re-reception of the broadcast information. Further, in the user equipment terminal, the broadcast information re-reception unit performs the re-reception of the broadcast information after a predetermined re-reception process suspension period has passed.

Advantageous Effect of the Invention

According to an embodiment of the present invention, there may be provided a user equipment terminal capable of reducing the battery consumption when the change of the broadcast control information is notified.

BRIEF DESCRIPTION OF THE DRAWINGS

FIG. 7 is a timing chart showing the relationship among the reception timing of the Physical Downlink Control Channel (PDCCH), the detection timing of Broadcast Control Channel change Radio Network Temporary Identity (BCCH change RNTI), and the timing of the Broadcast Control Channel (BCCH) re-reception process according to another embodiment of the present invention;

FIG. 8 is a timing chart showing the relationship among the reception timing of the Physical Downlink Control Channel (PDCCH), the detection timing of Broadcast Control Channel change, and the timing of the Broadcast Control Channel (BCCH) re-reception process according to another embodiment of the present invention;

FIG. 9 is a partial block diagram showing an configuration of the user equipment (UE) terminal according to another embodiment of the present invention;

FIG. 10 is a partial block diagram showing another configuration of the user equipment (UE) terminal according to another embodiment of the present invention; and FIG. 11 is a timing chart showing the relationship among the reception timing of the Physical Downlink Control Channel (PDCCH), the detection timing of Broadcast Control Channel change, and the timing of the Broadcast Control Channel (BCCH) re-reception process according to another embodiment of the present invention.

EXPLANATION OF REFERENCES

50: CELL
$100_n$, ($100_1$, $100_2$, $100_3$, $100_n$): USER EQUIPMENT (UE) TERMINAL(S)
102: RECEIVING RF SECTION
104: MAC PROCESSING SECTION
106: RRC PROCESSING SECTION
200: BASE STATION APPARATUS
300: ACCESS GATEWAY APPARATUS
400: CORE NETWORK
1000: RADIO COMMUNICATION SYSTEM

BEST MODE FOR CARRYING OUT THE INVENTION

Next, a best mode carrying out the present invention is described based on the following embodiments with reference to the accompanying drawings. Throughout the figures illustrating the embodiments, the same reference numbers may be used to refer to the elements having the same or similar function, and repeated descriptions thereof may be omitted.

Figure 1:
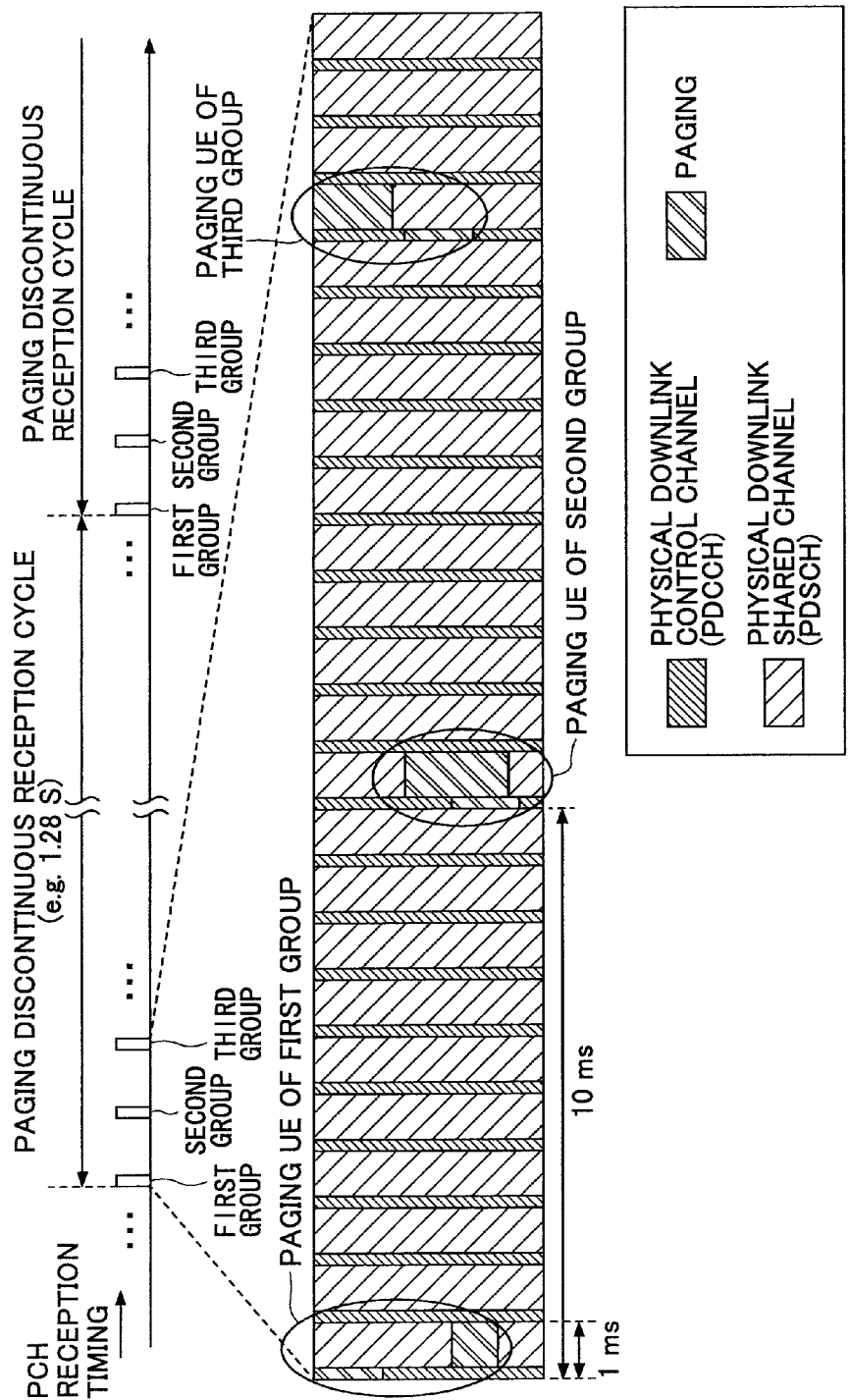
FIG. 1 is a drawing showing an example of how paging is performed.
Figure 2:
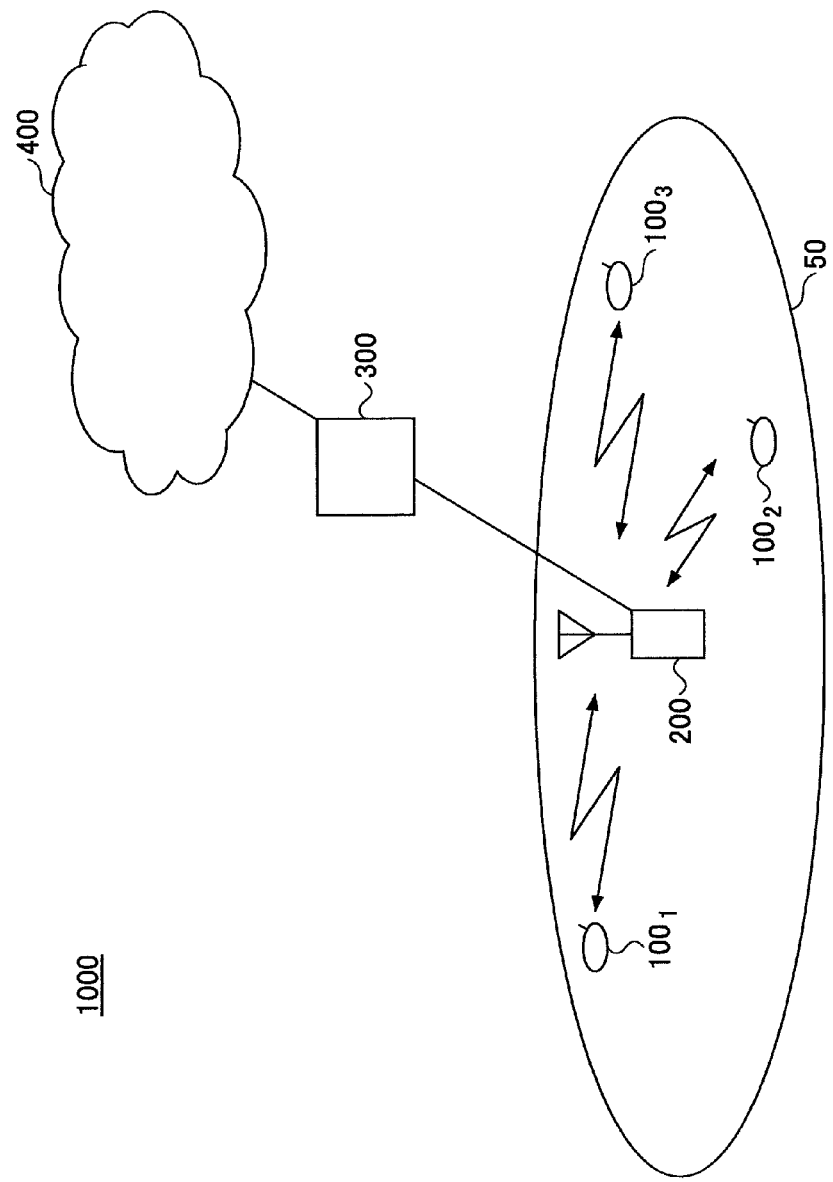
FIG. 2 is a schematic system diagram showing a radio communication system according to an embodiment of the present invention.

First, with reference to FIG. 2, a radio communication system 1000 is described including a user equipment (UE) terminal $100_n$ according to an embodiment of the present invention. In this embodiment, the radio communication system 1000 is described as a system in which an LTE (Long Term Evolution) system is applied. However, the present invention may be applicable to a system including a user equipment (UE) terminal capable of performing a Discontinuous Reception (DRX). More generally, the present invention may be applicable to a radio communication system as long as, in the system, information corresponding to broadcast control information change notification is transmitted from the network, and based on the broadcast control information change notification, a re-reception process to receive the broadcast information (again) is performed.

The radio communication system 1000, which may be, for example, an Evolved UTRA and UTRAN (a.k.a. the Long Term Evolution (LTE) or a Super 3G) system, includes the base station apparatus (eNB: eNode B) 200, plural user equipment (UE) terminals $100_n$ ($100_1$, $100_2$, $100_3$, ... $100_n$; n: an integer greater than zero (0)). The base station apparatus 200 is connected to an upper node station such as an access gateway apparatus 300. The access gateway apparatus 300 is connected to a core network 400. Further, the user equipment (UE) terminals $100_n$ in a cell 50 covered by the base station apparatus 200 is communicated with the base station apparatus 200 based on the Evolved UTRA and UTRAN.

In the following, the user equipment (UE) terminals $100_n$ ($100_1$, $100_2$, ... $100_3$, $100_n$) have the same configuration, functions, and modes; and therefore, unless otherwise described, those user equipment (UE) terminals $100_n$ ($100_1$, $100_2$, $100_3$, $100_n$) may be collectively referred to as a user equipment (UE) terminal(s) $100_n$. For explanatory purpose, in the description, the term user equipment (UE) terminal is representatively used. However, more generally, a mobile terminal (mobile station), a fixed terminal and the like are included in the user equipment (UE) terminal.

In the radio communication system 1000, as a radio access scheme, an OFDM (Orthogonal Frequency Division Multiplexing) scheme and an SC-FDMA (Single-Carrier Frequency Division Multiple Access) scheme are applied to downlink communications and uplink communications, respectively. In the OFDM scheme, a frequency band is divided into plural frequency bands (sub-carriers) so that data can be transmitted using the frequency bands. On the other hand, in the SC-FDMA scheme, a frequency band is divided into plural narrower frequency band so that data can be transmitted using different frequency bands among plural mobile stations. Base on the scheme, it may become possible to reduce the interference among user equipment (UE) terminals.

The access gateway apparatus (aGW) 300 may be included in the core network 400 or may be included in a network other than the core network 400. Further, the access gateway apparatus (aGW) 300 may be divided into two logical entities, that is, the control plane (C-plane) logical entity and the user plane (U-plane) logical entity, to provide the Mobility Management Entity (MME)/Serving Gateway (S-GW). Further, the core network 400 may include a Home Location Register (not shown), which stores an identifier of the access gateway apparatus (aGW) 300 managing the user equipment (UE) terminals $100_n$.

Next, a radio communication system according to a first embodiment of the present invention is described.

In a radio communication system according to this embodiment of the present invention, the base station apparatus 200 notifies the change of the broadcast information to user equipment (UE) terminal $100_n$ in communication with the base station apparatus 200. This notification from the base station apparatus 200 to the user equipment (UE) terminal $100_n$ is made by using a Broadcast Control Channel change Radio Network Temporary Identity (hereinafter referred to as BCCH change RNTI).

Figure 3:
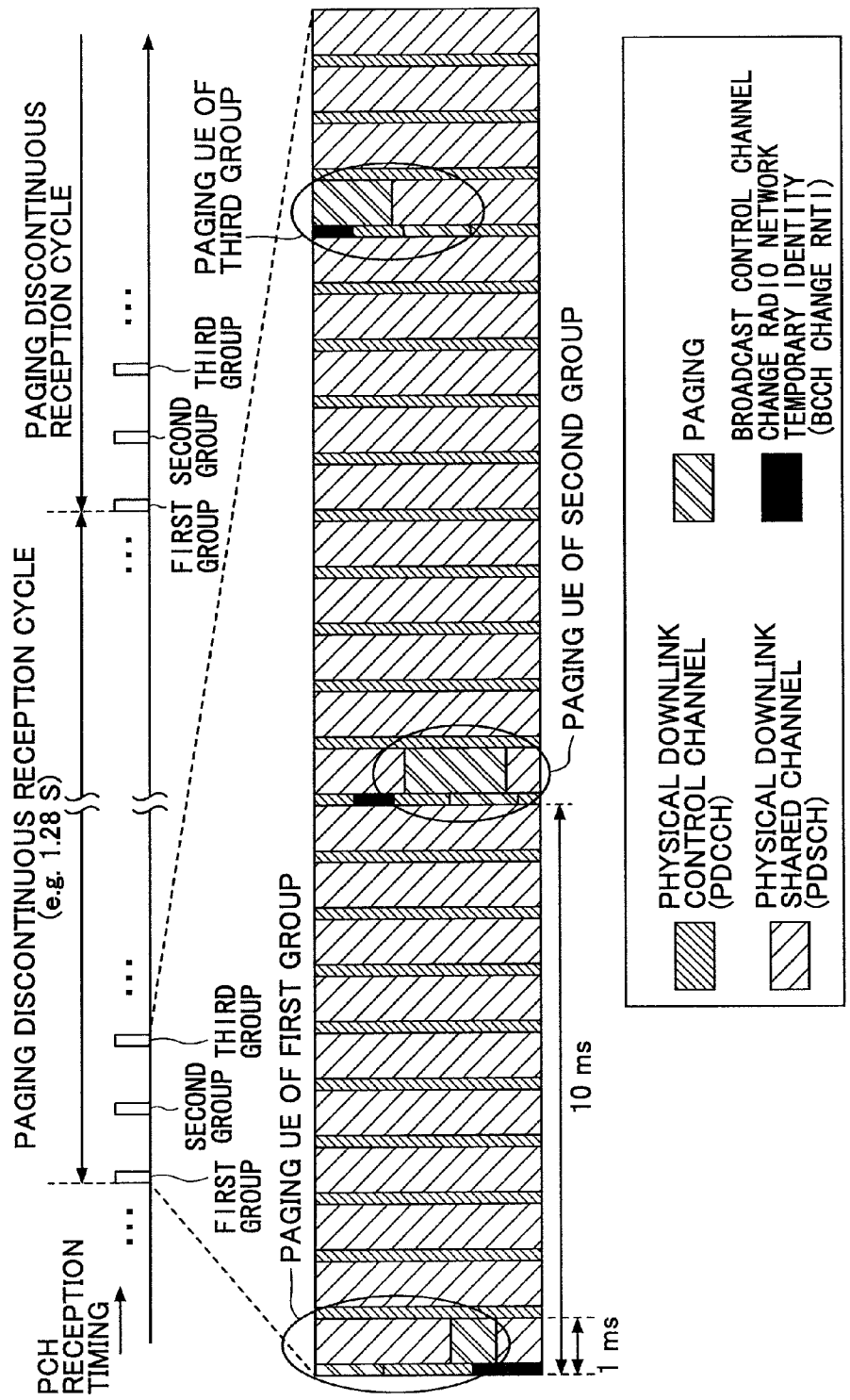
FIG. 3 is a drawing showing Broadcast Control Channel (BCCH) Change Notification according to an embodiment of the present invention.

When there is an incoming call to a user equipment (UE) terminal $100_n$ belonging to a group, the base station apparatus 200 notifies the incoming call by transmitting a Physical Downlink Control Channel (PDCCH) addressed to a Paging-Radio Network Temporary Identity (hereinafter referred to as P-RNTI) relevant to the group. In addition to this, upon the incoming call, the base station apparatus 200 notifies the user equipment (UE) terminal 100$_n$ of the change of the broadcast information by transmitting a Physical Downlink Control Channel (PDCCH) addressed to the BCCH change RNTI. As shown in FIG. 3, this Physical Downlink Control Channel (PDCCH) addressed to the BCCH change RNTI is mapped to a different position than where the Physical Downlink Control Channel (PDCCH) addressed to the P-RNTI is mapped. Accordingly, the user equipment (UE) terminal 100$_n$ waits for (monitors) not only the P-RNTI but also the BCCH change RNTI to check (determine) whether the notification of the change of the broadcast information is received (detected).

From the viewpoint of ensuring the reception of the BCCH change RNTI to all the user equipment (UE) terminals 100$_n$ in the area covered by the base station apparatus 200, it is preferable that the BCCH change RNTI is repeatedly transmit for a period longer than a maximum discontinuous reception cycle supported by the system (i.e., the cell). More preferably, the period is about two (2) or three (3) times longer than the maximum discontinuous reception cycle. In this case, it is assumed that all the user equipment (UE) terminals 100$_n$ include the user equipment (UE) terminals in an active mode (communicating with the base station apparatus 200) and in a Discontinuous Reception (DRX) mode (performing the Discontinuous Reception) at the same time. Further, in this case, the BCCH change RNTI is repeatedly transmitted in every TTI for a period longer than the maximum discontinuous reception cycle supported by the system. By transmitting in this way, even if a user equipment (UE) terminal 100$_n$ fails to receive the BCCH change RNTI transmitted once, there may be a high possibility for the user equipment (UE) terminal 100$_n$ to finally receive the BCCH change RNTI because plural chances of receiving the BCCH change RNTI are given to the user equipment (UE) terminal 100$_n$. Specifically, the maximum discontinuous reception cycle supported by the system may be any of 640 ms, 1,280 ms, and 2,560 ms.

In the above description of this embodiment, a case is described where the change of the broadcast information is notified using the BCCH change RNTI. However, the present invention is not limited to this configuration. For example, the content of the change of the broadcast information may be notified by using the Physical Downlink Control Channel (PDCCH) including the BCCH change RNTI or by using a Physical Downlink Shared Channel (PDSCH). When the content of the change of the broadcast information is transmitted by using the Physical Downlink Shared Channel (PDSCH), the resource block position and the transport format of the Physical Downlink Shared Channel (PDSCH) to be read may be notified by the BCCH change RNTI.

Figure 4:
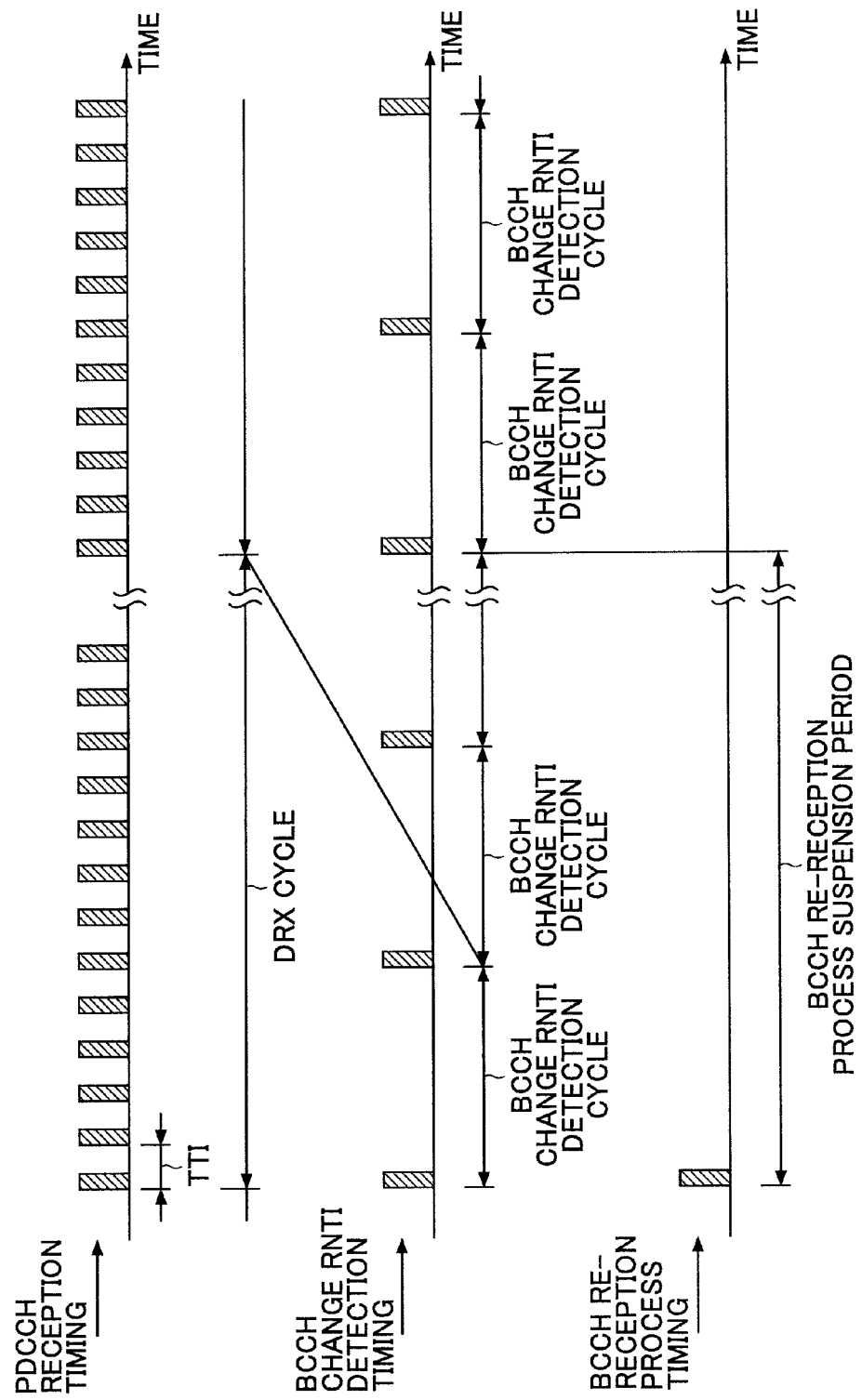
FIG. 4 is a timing chart showing the relationship among the reception timing of the Physical Downlink Control Channel (PDCCH), the detection timing of Broadcast Control Channel change Radio Network Temporary Identity (BCCH change RNTI), and the timing of Broadcast Control Channel (BCCH) re-reception process according to an embodiment of the present invention.

Further, according to this embodiment of the present invention, the base station apparatus 200 designates (specifies) a BCCH change RNTI detection cycle which is defined herein as a detection cycle for detecting/receiving the BCCH change RNTI included in the Physical Downlink Control Channel (PDCCH) as shown in the middle of FIG. 4. When the BCCH change RNTI is repeatedly transmitted in every TTI for a period longer than the maximum discontinuous reception cycle supported by the system (see FIG. 4), it is preferable that the time length of the BCCH change RNTI detection cycle is longer than the TTI and shorter than the maximum discontinuous reception cycle supported by the system. By determining in this way, the number of detecting the BCCH change RNTI included in the Physical Downlink Control Channel (PDCCH) may be reduced, thereby saving the battery power of the user equipment (UE) terminal 100$_n$. As exemplarily indicated in FIG. 4, the BCCH change RNTI may be configured to be detected every maximum discontinuous reception cycle supported by the system from among all the BCCH change RNTI in the Physical Downlink Control Channel (PDCCH) transmitted in every TTI. Further, the BCCH change RNTI is not always necessary to be detected at a predetermined constant cycle; and, in other words, it may be acceptable as long as the BCCH change RNTI is detected at least once within the predetermined constant cycle.

According to this embodiment of the present invention, when the BCCH change RNTI is detected as a result of the detection of the BCCH change RNTI in the BCCH change RNTI detection cycle by the user equipment (UE) terminal 100$_n$, the base station apparatus 200 further designates (specifies) a BCCH re-reception process suspension period which is defined herein as a period in which the process of re-receipt of the changed Broadcast Control Channel (BCCH) is suspended (i.e., the reception of the changed Broadcast Control Channel (BCCH) indicating the change of the broadcast information is ignored during this BCCH re-reception process suspension period). From the viewpoint of reducing the number of performing the re-reception of a similar changed Broadcast Control Channel (BCCH), it is preferable that the BCCH re-reception process suspension period is similar to the period of the BCCH change RNTI detection cycle. FIG. 4 exemplarily indicates the case where the BCCH re-reception process suspension period is similar to the period of the BCCH change RNTI detection cycle. By determining in this way, the number of repeated the same process caused by the reception of similar BCCH change RNTI may be reduced. In the BCCH re-reception process suspension period, the base station apparatus 200 may be configured to transmit the Broadcast Control Channel (BCCH) having similar content. Namely, the base station apparatus 200 may determine that the BCCH re-reception process suspension period is equal to a time unit in which the Broadcast Control Channel (BCCH) can be changed once. This time unit in which the Broadcast Control Channel (BCCH) can be changed once may also be called a BCCH modification period. Otherwise, during the BCCH re-reception process suspension period, the base station apparatus 200 may transmit the Broadcast Control Channel (BCCH) having at least partially different content. However, in this case, the user equipment (UE) terminal 100$_n$ performs processes assuming that the Broadcast Control Channel (BCCH) having similar content is being transmitted in this BCCH re-reception process suspension period.

Further, the base station apparatus 200 notifies the user equipment (UE) terminals 100$_n$ of the BCCH change RNTI detection cycle and the BCCH re-reception process suspension period as system broadcast information. In this case, the base station apparatus 200 may separately notify the BCCH change RNTI detection cycle and the BCCH re-reception process suspension period with respect to each of the user equipment (UE) terminals 100$_n$ using separate signaling packets. By separately notifying in this way, it may become possible to ensure the notification of the BCCH change RNTI detection cycle and the BCCH re-reception process suspension period when, for example, the user equipment (UE) terminal 100$_n$ starts communication with the base station apparatus 200, the user equipment (UE) terminal 100$_n$ changes its mode from a mode waiting for an incoming call to a mode communicating with the base station apparatus 200, and the user equipment (UE) terminal 100$_n$ moves into a new cell during handover.

The user equipment (UE) terminal 100$_n$ checks (determines) whether there is the Physical Downlink Control Channel (PDCCH) addressed to the P-RNTI corresponding to the user equipment (UE) terminal 100$_n$. The Physical Downlink Control Channel (PDCCH) includes a Cell specific Radio Network Temporary Identity (hereinafter may be referred to as C-RNTI), a transport format, resource block position information and the like. Further, the user equipment (UE) terminal $100_n$ determines whether the Physical Downlink Control Channel (PDCCH) is transmitted to the BCCH change RNTI at (or within) the BCCH change RNTI detection cycle notified by the base station apparatus 200.

Upon detecting the BCCH change RNTI as a result of performing the detection process of the BCCH change RNTI at (or within) the BCCH change RNTI detection cycle, the user equipment (UE) terminal $100_n$ performs the re-reception of the changed broadcast information (i.e., receives the changed broadcast information (again)). Then, the user equipment (UE) terminal $100_n$ suspends the detection of the BCCH change RNTI during the BCCH re-reception process suspension period notified by the base station apparatus 200.

An exemplary configuration of the user equipment (UE) terminal $100_n$ according to this embodiment of the present invention is described with reference to FIG. 5.

Figure 5:
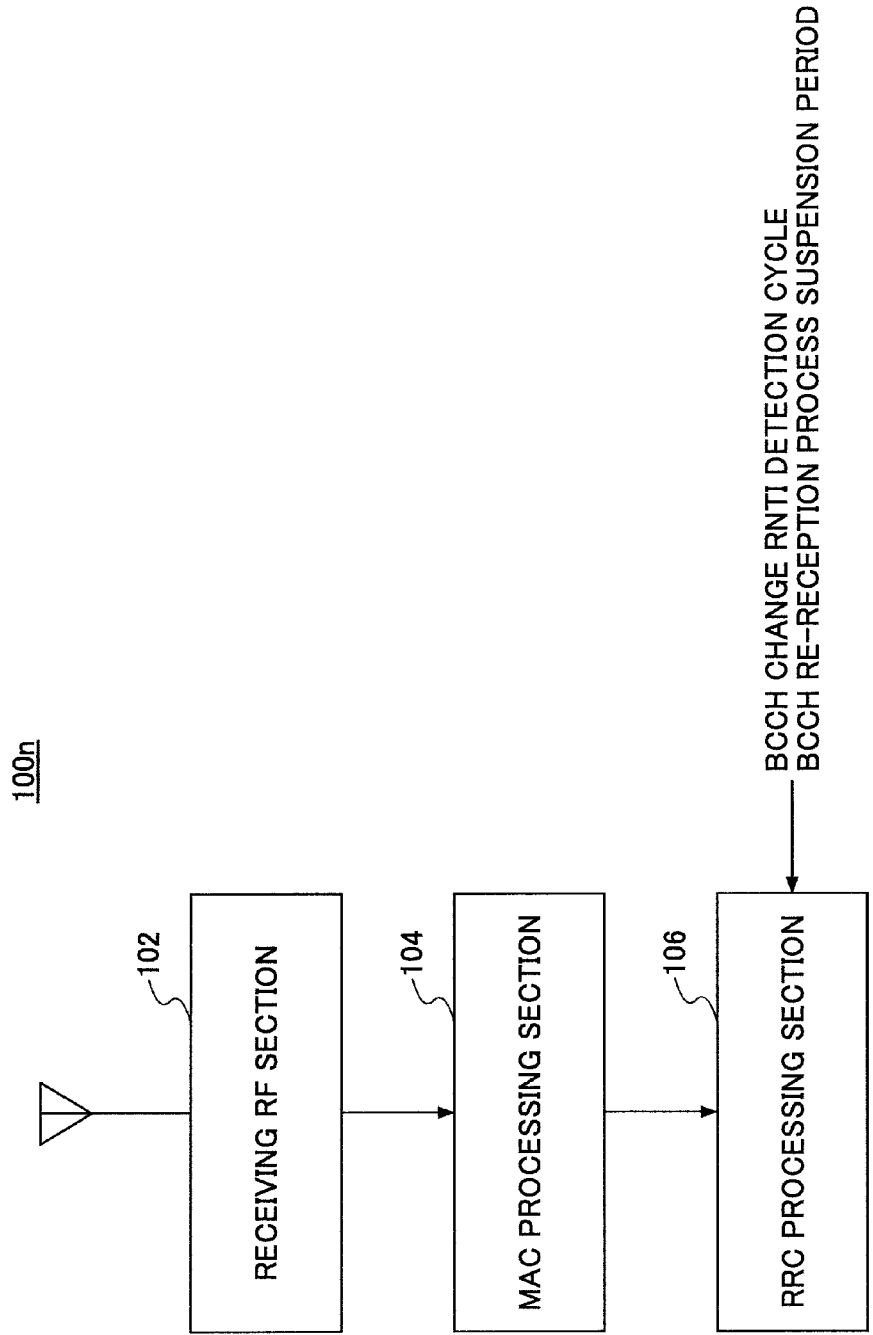
FIG. 5 is a partial block diagram showing a configuration of the user equipment (UE) terminal according to an embodiment of the present invention.

As shown in FIG. 5, the user equipment (UE) terminal $100_n$ includes a receiving RF section 102, a MAC (Medium Access Control) processing section 104 serving as a determination unit, and an RRC (Radio Resource Control) processing section 106 serving as a broadcast information re-reception unit.

The RRC processing section 106 inputs (receives) the BCCH change RNTI detection cycle and the BCCH re-reception process suspension period.

While the user equipment (UE) terminal $100_n$ is in communication, the receiving RF section 102 receives the Physical Downlink Control Channel (PDCCH) every TTI and inputs the received Physical Downlink Control Channel (PDCCH) to the MAC processing section 104. On the other hand, while the user equipment (UE) terminal $100_n$ is in the Discontinuous Reception (DRX), the receiving RF section 102 receives the Physical Downlink Control Channel (PDCCH) at the timing of the Discontinuous Reception (DRX) and inputs the received Physical Downlink Control Channel (PDCCH) to the MAC processing section 104.

The MAC processing section 104 checks the C-RNTI included in the Physical Downlink Control Channel (PDCCH) to determine whether the C-RNTI corresponding to the user equipment (UE) terminal $100_n$ is detected (included) in the Physical Downlink Control Channel (PDCCH). When determining that the C-RNTI corresponding to the user equipment (UE) terminal $100_n$ is detected, the MAC processing section 104 inputs the detected C-RNTI to the RRC processing section 106. Further, the MAC processing section 104 checks the Physical Downlink Control Channel (PDCCH) received from the receiving RF section 102 to determine whether the BCCH change RNTI is included (detected) in the received Physical Downlink Control Channel (PDCCH). When determining that the BCCH change RNTI is detected, the MAC processing section 104 inputs the detected BCCH change RNTI to the RRC processing section 106.

Upon inputting (receiving) the C-RNTI corresponding to the user equipment (UE) terminal $100_n$ from the MAC processing section 104, the RRC processing section 106 receives the transport format and the resource block position information included in the Physical Downlink Control Channel (PDCCH) and performs the re-reception of the Physical Downlink Shared Channel (PDSCH) based on the received transport format and the resource block position information. Further, upon inputting the BCCH change RNTI from the MAC processing section 104 as a result of the detection process based on the BCCH change RNTI detection cycle, the RRC processing section 106 performs the re-reception of the broadcast information. More specifically, when the BCCH change RNTI is detected at the detection timing based on the BCCH change RNTI detection cycle and the detected BCCH change RNTI is input from the MAC processing section 104, the RRC processing section 106 receives the broadcast information again. In this case, for example, the RRC processing section 106 may perform the re-reception process of the broadcast information based on an instruction included in the Physical Downlink Control Channel (PDCCH) addressed to the BCCH change RNTI.

As described above, by receiving the content of the change of the broadcast information when the BCCH change RNTI is detected based on the BCCH change RNTI detection cycle without being required to perform a reception process of the content of change of the broadcast information at all the timings when the Physical Downlink Control Channel (PDCCH) is input from the receiving RF section 102, the power consumption required to receive the content of the change of the broadcast information may be reduced, thereby saving the battery power.

Further, during the BCCH re-reception process suspension period, even if the BCCH change RNTI is detected at the detection timing based on the BCCH change RNTI detection cycle and is input from the MAC processing section 104, the RRC processing section 106 does not perform the process corresponding to the BCCH change RNTI (that is, the RRC processing section 106 does not perform the re-reception of the broadcast information). To that end, for example, the RRC processing section 106 may start a timer to suspend the re-reception of the broadcast information during the BCCH re-reception process suspension period. By suspending the re-reception in this way, the number of times of performing the re-reception of similar broad cast information may be reduced.

Alternatively, the user equipment (UE) terminal $100_n$ may have the following configuration.

Another configuration of the user equipment (UE) terminal $100_n$ according to this embodiment of the present invention is described with reference to FIG. 6.

Figure 6:
FIG. 6 is a partial block diagram showing another configuration of the user equipment (UE) terminal according to another embodiment of the present invention.

As shown in FIG. 6, the user equipment (UE) terminal $100_n$ includes the receiving RF section 102, the MAC processing section 104, and the RRC processing section 106.

The RRC processing section 106 inputs (receives) the BCCH change RNTI detection cycle and the BCCH re-reception process suspension period.

While the user equipment (UE) terminal $100_n$ is in communication, the receiving RF section 102 receives the Physical Downlink Control Channel (PDCCH) every TTI and inputs the received Physical Downlink Control Channel (PDCCH) to the MAC processing section 104. On the other hand, while the user equipment (UE) terminal $100_n$ is in the Discontinuous Reception (DRX), the receiving RF section 102 receives the Physical Downlink Control Channel (PDCCH) at the timing of the Discontinuous Reception (DRX) and inputs the received Physical Downlink Control Channel (PDCCH) to the MAC processing section 104.

The MAC processing section 104 checks the C-RNTI included in the Physical Downlink Control Channel (PDCCH) to determine whether the C-RNTI corresponding to the user equipment (UE) terminal $100_n$ is detected (included) in the Physical Downlink Control Channel (PDCCH). When determining that the C-RNTI corresponding to the user equipment (UE) terminal $100_n$ is detected, the MAC processing section 104 inputs the detected C-RNTI to the RRC processing section 106. Further, the MAC processing section 104 checks (determines) whether the BCCH change RNTI is included (detected) in the Physical Downlink Control Channel (PDCCH) at a predetermined detection timing based on the BCCH change RNTI detection cycle, the Physical Downlink Control Channel having been input (received) from the receiving RF section 102. When determining that the BCCH change RNTI is detected, the MAC processing section 104 inputs the detected BCCH change RNTI to the RRC processing section 106.

Further, during the BCCH re-reception process suspension period, even at the predetermined detection timing based on the BCCH change RNTI detection cycle, the MAC processing section 104 does not check (determine) whether the BCCH change RNTI is included (detected) in the Physical Downlink Control Channel (PDCCH) input from the receiving RF section 102. For example, as exemplarily indicated in FIG. 7, the MAC processing section 104 checks (determines) whether the BCCH change RNTI is included (detected) in the Physical Downlink Control Channel (PDCCH) at a predetermined detection timing based on the BCCH change RNTI detection cycle. When determining that the BCCH change RNTI is detected, during the BCCH re-reception process suspension period, even at the predetermined detection timing based on the BCCH change RNTI detection cycle, the MAC processing section 104 does not check (determine) whether the BCCH change RNTI is included (detected). FIG. 7 shows a case where the BCCH change RNTI is detected in the first Physical Downlink Control Channel (PDCCH); the re-reception of the Broadcast Control Channel (BCCH) is performed; and after the BCCH re-reception process suspension period has passed, no BCCH change RNTI is detected (included) in the Physical Downlink Control Channel (PDCCH). For example, the MAC processing section 104 may start a timer to suspend the process of checking (determining) whether the BCCH change RNTI is included (detected) in the Physical Downlink Control Channel (PDCCH).

In this embodiment of the present invention, the RRC processing section 106 inputs the BCCH change RNTI detection cycle and the BCCH re-reception process suspension period to the MAC processing section 104. In this case, the MAC processing section 104 checks (determines) whether the BCCH change RNTI is included (detected) in the Physical Downlink Control Channel (PDCCH) at a predetermined detection timing of the BCCH change RNTI, based on the BCCH change RNTI detection cycle.

As described above, by detecting the BCCH change RNTI at a predetermined detection timing based on the BCCH change RNTI detection cycle without detecting the BCCH change RNTI at all the timings when the Physical Downlink Control Channel (PDCCH) is input from the receiving RF section 102, the power consumption required for detecting the BCCH change RNTI may be reduced, thereby saving the battery power. Further, when the BCCH change RNTI is detected, by not checking (determining) whether BCCH change RNTI is included (detected) during the BCCH re-reception process suspension period even at the predetermined detection timing based on the BCCH change RNTI detection cycle, the number of re-reception process of receiving the broadcast information having similar content may be reduced.

Upon inputting the C-RNTI corresponding to the user equipment (UE) terminal $100_n$ from the MAC processing section 104, the RRC processing section 106 receives the transport format and the resource block position information included in the Physical Downlink Control Channel (PDCCH) and performs the re-reception of the Physical Downlink Shared Channel (PDSCH) based on the received transport format and the resource block position information. Further, upon inputting (receiving) the BCCH change RNTI from the MAC processing section 104, the RRC processing section 106 performs the re-reception of the broadcast information. To that end, for example, the RRC processing section 106 may perform the re-reception of the broadcast information based on an instruction included in the Physical Downlink Control Channel (PDCCH) addressed to the BCCH change RNTI. Alternatively, first, the RRC processing section 106 may receive the Physical Downlink Control Channel (PDCCH) addressed to the BCCH change RNTI. Then, the RRC processing section 106 may receive the Physical Downlink Shared Channel (PDSCH) as addressed in the Physical Downlink Control Channel (PDCCH), and perform the re-reception of the broadcast information based on an instruction included in the Physical Downlink Shared Channel (PDSCH).

Further, the RRC processing section 106 may notify the MAC processing section 104 of the detection timing of detecting the BCCH change RNTI determined based on the BCCH change RNTI detection cycle. In this case, the MAC processing section 104 checks (determines) whether the BCCH change RNTI is included (detected) in the Physical Downlink Control Channel (PDCCH) based on of the received detection timing of detecting the BCCH change RNTI. Upon inputting (receiving) the BCCH change RNTI from the MAC processing section 104, the RRC processing section 106 performs the re-reception of the broadcast information. The RRC processing section 106, however, does not notify the MAC processing section 104 of the detection timing of detecting the BCCH change RNTI during the BCCH re-reception process suspension period even at the predetermined detection timing based on the BCCH change RNTI detection cycle. To that end, for example, the RRC processing section 106 starts a timer to suspend the process of notifying the MAC processing section 104 of the detection timing of detecting the BCCH change RNTI during the BCCH re-reception process suspension period.

Next, a radio communication system according to a second embodiment of the present invention is described.

In the radio communication system of this embodiment, the base station apparatus 200 notifies the user equipment (UE) terminal $100_n$ of the change of the broadcast information using the P-RNTI. More specifically, as described above, when there is an incoming call to a user equipment (UE) terminal $100_n$ belonging to a group, the base station apparatus 200 transmits the Physical Downlink Control Channel (PDCCH) addressed to the P-RNTI corresponding to the group. In this embodiment of the present invention, the base station apparatus 200 performs BCCH Change Notification (notifying the change of the BCCH) using the P-RNTI. In this case, for example, the Physical Downlink Control Channel (PDCCH) may be used for the BCCH Change Notification. Otherwise, similar to general paging, the Physical Downlink Control Channel (PDCCH) using (including) the P-RNTI may be transmitted and the Physical Downlink Shared Channel (PDSCH) may be used for the BCCH Change Notification. In this case, the BCCH Change Notification is performed by using, for example, a paging message transmitted in the Physical Downlink Shared Channel (PDSCH).

From the viewpoint of ensuring the reception of the BCCH change Notification to all the user equipment (UE) terminals $100_n$ existing in the area covered by the base station apparatus 200, it is preferable to repeatedly transmit the BCCH change Notification for a period longer than the maximum discontinuous reception cycle supported by the system (that is, the cell). More preferably, the period is about two (2) or three (3) times longer than the maximum discontinuous reception cycle. In this case, it is assumed that all the user equipment (UE) terminals $100_n$ include the user equipment (UE) terminals in the Discontinuous Reception (DRX) mode (performing the Discontinuous Reception). Further, in this case, the BCCH change Notification is repeatedly transmitted in every TTI for a period longer than the maximum discontinuous reception cycle supported by the system. By transmitting in this way, even if a user equipment (UE) terminal $100_n$ fails to receive the P-RNTI transmitted once, there may be a high possibility for the user equipment (UE) terminal $100_n$ to finally receive the P-RNTI because plural chances of receiving the P-RNTI are given to the user equipment (UE) terminal $100_n$. Specifically, the maximum discontinuous reception cycle supported by the system may be any of 640 ms, 1,280 ms, and 2,560 ms.

In this embodiment, the change of the broadcast information is notified by using the P-RNTI. However, the present invention is not limited to this configuration. For example, the content of the change of the broadcast information may be notified by using the Physical Downlink Control Channel (PDCCH) including the P-RNTI or by using a Physical Downlink Shared Channel (PDSCH). When the content of the change of the broadcast information is transmitted using the Physical Downlink Shared Channel (PDSCH), the resource block position and the transport format of the Physical Downlink Shared Channel (PDSCH) to be read may be designated (specified) in the P-RNTI.

Further, according to this embodiment of the present invention, the base station apparatus 200 designates (specifies) a BCCH change detection cycle which is defined herein as a detection cycle for detecting/receiving the change of the BCCH using the P-RNTI included in the Physical Downlink Control Channel (PDCCH). When the BCCH change Notification is repeatedly transmitted in every TTI for a period longer than the maximum discontinuous reception cycle supported by the system, it is preferable that the time length of the BCCH change detection cycle is longer than the TTI and shorter than the maximum discontinuous reception cycle supported by the system. By determining in this way, the number of detecting the change of the BCCH using the P-RNTI included in the Physical Downlink Control Channel (PDCCH) transmitted in every TTI may be reduced; and therefore, the battery power may be saved. To that end, as exemplarily indicated in FIG. 8, the change of the BCCH may be detected every maximum discontinuous reception cycle supported by the system from among all the Physical Downlink Control Channel (PDCCH) transmitted in every TTI.

Further, according to this embodiment of the present invention, when the change of the BCCH is detected as a result of the detection of the change of the BCCH using the P-RNTI in the BCCH change detection cycle by the user equipment (UE) terminal $100_n$, the base station apparatus 200 designates (specifies) the BCCH re-reception process suspension period which is defined herein as the period in which the process of re-receipt of the changed Broadcast Control Channel (BCCH) is suspended (i.e., the reception of the changed Broadcast Control Channel (BCCH) is ignored during this BCCH re-reception process suspension period). From the viewpoint of reducing the number of performing the re-reception of similar changed Broadcast Control Channel (BCCH), it is preferable that the BCCH re-reception process suspension period is similar to the period of the BCCH change detection cycle.

FIG. 8 indicates the case where the BCCH re-reception process suspension period is similar to the period of the BCCH change detection cycle. By determining in this way, the number of repeated the same process caused by the reception of similar BCCH change Notification may be reduced. FIG. 8 shows a case where the BCCH change Notification is detected in the first Physical Downlink Control Channel (PDCCH); the re-reception of the Broadcast Control Channel (BCCH) is performed; and no further BCCH change Notification is detected in the Physical Downlink Control Channel (PDCCH) after the BCCH re-reception process suspension period has passed. During the BCCH re-reception process suspension period, the base station apparatus 200 may be configured to transmit the Broadcast Control Channel (BCCH) having similar content. Namely, the base station apparatus 200 may determine that the BCCH re-reception process suspension period is equal to the time unit in which the Broadcast Control Channel (BCCH) can be changed once. This time unit in which the Broadcast Control Channel (BCCH) can be changed once may also be called a BCCH modification period. Otherwise, during the BCCH re-reception process suspension period, the base station apparatus 200 may transmit the Broadcast Control Channel (BCCH) having at least partially different content. However, in this case, the user equipment (UE) terminal $100_n$ performs processes assuming that the Broadcast Control Channel (BCCH) having similar content is being transmitted in the BCCH re-reception process suspension period.

Further, the base station apparatus 200 notifies the user equipment (UE) terminals $100_n$ of the BCCH change detection cycle and the BCCH re-reception process suspension period as system broadcast information. In this case, the base station apparatus 200 may separately notify the BCCH change detection cycle and the BCCH re-reception process suspension period with respect to each of the user equipment (UE) terminals $100_n$ using separate signaling packets. By separately notifying in this way, it may become possible to ensure the notification of the BCCH change detection cycle and the BCCH re-reception process suspension period when, for example, the user equipment (UE) terminal $100_n$ starts communication with the base station apparatus 200, the user equipment (UE) terminal $100_n$ changes its mode from a mode waiting for an incoming call to a mode communicating with the base station apparatus 200, and the user equipment (UE) terminal $100_n$ moves into a new cell during handover.

The user equipment (UE) terminal $100_n$ checks (determines) whether the group to which the user equipment (UE) terminal $100_n$ belongs is designated (specified) in the P-RNTI included in the Physical Downlink Control Channel (PDCCH). This Physical Downlink Control Channel (PDCCH) includes the C-RNTI, the transport format, the resource block position information and the like. Further, the user equipment (UE) terminal $100_n$ determines whether the BCCH change Notification is transmitted (detected) using the P-RNTI in the BCCH change detection cycle notified by the base station apparatus 200.

When determining that the group to which the user equipment (UE) terminal $100_n$ belongs is designated (specified) in the P-RNTI and that the BCCH change Notification is transmitted (detected) as a result of receiving the BCCH change Notification using the P-RNTI in the BCCH change detection cycle, the user equipment (UE) terminal $100_n$ performs the re-reception of the changed broadcast information. Then, the user equipment (UE) terminal $100_n$ suspends the reception of the BCCH change Notification using the P-RNTI during the BCCH re-reception process suspension period notified by the base station apparatus 200.

An exemplary configuration of the user equipment (UE) terminal $100_n$ according to this embodiment of the present invention is described with reference to FIG. 9. As shown in FIG. 9, the user equipment (UE) terminal $100_n$ includes the receiving RF section 102, the MAC processing section 104, and the RRC processing section 106.

The RRC processing section 106 inputs (receives) the BCCH change detection cycle and the BCCH re-reception process suspension period.

While the user equipment (UE) terminal $100_n$ is in communication, the receiving RF section 102 receives the Physical Downlink Control Channel (PDCCH) every TTI and inputs the received Physical Downlink Control Channel (PDCCH) to the MAC processing section 104. On the other hand, while the user equipment (UE) terminal $100_n$ is in the Discontinuous Reception (DRX), the receiving RF section 102 receives the Physical Downlink Control Channel (PDCCH) at the timing of the Discontinuous Reception (DRX) to, for example, check (determine) whether the Physical Downlink Control Channel (PDCCH) addressed to the P-RNTI is included (detected) and inputs the received Physical Downlink Control Channel (PDCCH) to the MAC processing section 104.

The MAC processing section 104 checks the C-RNTI included in the Physical Downlink Control Channel (PDCCH) to determine whether the C-RNTI corresponding to the user equipment (UE) terminal $100_n$ is detected (included) in the Physical Downlink Control Channel (PDCCH). When determining that the C-RNTI corresponding to the user equipment (UE) terminal $100_n$ is detected, the MAC processing section 104 inputs the detected C-RNTI to the RRC processing section 106. Further, the MAC processing section 104 checks (determines) whether the group to which the user equipment (UE) terminal $100_n$ belongs is designated (specified) in the P-RNTI included in the Physical Downlink Control Channel (PDCCH) input from the receiving RF section 102. When determining that the group to which the user equipment (UE) terminal $100_n$ belongs is designated (specified) in the P-RNTI, the MAC processing section 104 inputs the P-RNTI to the RRC processing section 106.

Upon inputting (receiving) the C-RNTI corresponding to the user equipment (UE) terminal $100_n$ from the MAC processing section 104, the RRC processing section 106 receives the transport format (or TB (Transport Block) size) and the resource block position information included in the Physical Downlink Control Channel (PDCCH) and performs the re-reception of the Physical Downlink Shared Channel (PDSCH) based on the received transport format and the resource block position information. Further, upon inputting (receiving) the P-RNTI detected by the MAC processing section 104 as a result of the detection process based on the BCCH change detection cycle, the RRC processing section 106 detects the BCCH change Notification by using the P-RNTI. However, the present invention is not limited to this configuration. For example, the BCCH change Notification may be detected based on the Physical Downlink Control Channel (PDCCH) including the P-RNTI. Otherwise, similar to general paging, the BCCH change Notification may be detected by using the Physical Downlink Shared Channel (PDSCH) based on the position of the BCCH change Notification designated (specified) in the Physical Downlink Control Channel (PDCCH) using the P-RNTI. Upon detecting the BCCH change Notification, the RRC processing section 106 performs the re-reception of the broadcast information. More specifically, when the P-RNTI is input by the MAC processing section 104 at the detection timing of the change of the BCCH based on the BCCH change detection cycle and the BCCH change Notification is detected as a result of detecting the BCCH change Notification based on the P-RNTI, the RRC processing section 106 performs the re-reception of the broadcast information. To that end, for example, the RRC processing section 106 may perform the re-reception of the broadcast information based on an instruction included in the Physical Downlink Control Channel (PDCCH) addressed to the P-RNTI. Otherwise, first, the Physical Downlink Control Channel (PDCCH) addressed to the P-RNTI may be received; then, the Physical Downlink Shared Channel (PDSCH) addressed in the Physical Downlink Control Channel (PDCCH) may be received; and the RRC processing section 106 may perform the re-reception of the broadcast information based on an instruction included in the Physical Downlink Control Channel (PDCCH).

As described above, according to this embodiment of the present invention, the P-RNTI is input and then it is determined whether the BCCH change Notification is detected based on the BCCH change detection cycle. In this case, the content of the change of the broadcast information is not received at all the timings when the P-RNTI is input by the MAC processing section 104. Then, when determining that the BCCH change Notification is detected, the content of the change of the broadcast information is received. In this way, the power consumption required to receive the content of the change of the broadcast information may be reduced, thereby saving the battery power.

Further, during the BCCH re-reception process suspension period, even if the P-RNTI is input by the MAC processing section 104 and even at the detection timing based on the BCCH change detection cycle, the RRC processing section 106 does not perform the process corresponding to the input P-RNTI (that is, the RRC processing section 106 does not perform the detection process of detecting the BCCH change Notification. As a result, the re-reception process of receiving the broadcast information is not performed. To that end, for example, the RRC processing section 106 may start a timer to suspend the re-reception of the broadcast information during the BCCH re-reception process suspension period. By suspending the re-reception in this way, the number of performing the re-reception of similar broad cast information may be reduced.

Alternatively, the user equipment (UE) terminal $100_n$ may have the following configuration.

Another configuration of the user equipment (UE) terminal $100_n$ according to this embodiment of the present invention is described with reference to FIG. 10.

As shown in FIG. 10, the user equipment (UE) terminal $100_n$ includes the receiving RF section 102, the MAC processing section 104, and the RRC processing section 106.

The RRC processing section 106 inputs the BCCH change detection cycle and the BCCH re-reception process suspension period.

While the user equipment (UE) terminal $100_n$ is in communication, the receiving RF section 102 receives the Physical Downlink Control Channel (PDCCH) every TTI and inputs the received Physical Downlink Control Channel (PDCCH) to the MAC processing section 104. On the other hand, while the user equipment (UE) terminal $100_n$ is in the Discontinuous Reception (DRX), the receiving RF section 102 receives the Physical Downlink Control Channel (PDCCH) at the timing of the Discontinuous Reception (DRX) and inputs the received Physical Downlink Control Channel (PDCCH) to the MAC processing section 104.

The MAC processing section 104 checks the C-RNTI included in the Physical Downlink Control Channel (PDCCH) to determine whether the C-RNTI corresponding to the user equipment (UE) terminal $100_n$ is detected (included) in the Physical Downlink Control Channel (PDCCH). When determining that the C-RNTI corresponding to the user equipment (UE) terminal $100_n$ is detected, the MAC processing section 104 inputs the detected C-RNTI to the RRC processing section 106. Further, the MAC processing section 104 checks (determines) whether the group to which the user equipment (UE) terminal $100_n$ belongs is designated (specified) in the P-RNTI included in the Physical Downlink Control Channel (PDCCH) input by the receiving RF section 102. When determining that the group to which the user equipment (UE) terminal $100_n$ belongs is designated (specified) in the P-RNTI, the MAC processing section 104 determines whether the BCCH change Notification is detected (included) by using the P-RNTI.

However, the present invention is not limited to this configuration. For example, the BCCH change Notification may be detected based on the Physical Downlink Control Channel (PDCCH) including the P-RNTI. Otherwise, similar to general paging, the BCCH change Notification may be detected using the Physical Downlink Shared Channel (PDSCH) based on the position of the BCCH change Notification designated (specified) in the Physical Downlink Control Channel (PDCCH) using the P-RNTI. The MAC processing section 104 inputs a BBC change notification determination result which is defined herein as a determination result whether the BCCH change Notification is detected to the RRC processing section 106. Further, during the BCCH re-reception process suspension period, even at the predetermined detection timing based on the BCCH change detection cycle or even when determining that the P-RNTI is included in the Physical Downlink Control Channel (PDCCH) input by the receiving RF section 102, the MAC processing section 104 does not check (determine) whether the BCCH change Notification is detected using the P-RNTI.

For example, as indicated in FIG. 11, the MAC processing section 104 checks (determines) whether the group to which the user equipment (UE) terminal $100_n$ belongs is designated (specified) in the P-RNTI at the detection timing based on the BCCH change detection cycle. When determining that the group to which the user equipment (UE) terminal $100_n$ belongs is designated (specified) in the P-RNTI, the MAC processing section 104 determines whether the BCCH change Notification is detected using the P-RNTI. When determining that the BCCH change Notification is detected, during the BCCH re-reception process suspension period, even at predetermined detection timing based on the BCCH change detection cycle, the MAC processing section 104 does not check (determine) whether the BCCH change Notification is detected using the P-RNTI.

FIG. 11 shows a case where the group to which the user equipment (UE) terminal $100_n$ belongs is designated (specified) in the P-RNTI in the first Physical Downlink Control Channel (PDCCH); as a result of the determination whether the BCCH change Notification is detected using the P-RNTI, the BCCH change Notification is determined to have been detected; and the re-reception of the Broadcast Control Channel (BCCH) (to receive the BCCH again) is performed. Further the case of FIG. 11 indicates that, after the BCCH re-reception process suspension period has passed, as a result of the determination whether the BCCH change Notification is detected using the P-RNTI in the Physical Downlink Control Channel (PDCCH), it is determined that no further BCCH change Notification is detected (included). In this case, for example, the MAC processing section 104 may start a timer to suspend the process of checking (determining) whether the BCCH change Notification is detected using the P-RNTI during the BCCH re-reception process suspension period even when the group to which the user equipment (UE) terminal $100_n$ belongs is designated (specified) in the P-RNTI in the first Physical Downlink Control Channel (PDCCH). In this embodiment of the present invention, the RRC processing section 106 inputs (receives) the BCCH change detection cycle and the BCCH re-reception process suspension period to the MAC processing section 104. In this case, when the group to which the user equipment (UE) terminal $100_n$ belongs is designated (specified) in the P-RNTI, the MAC processing section 104 checks (determines) whether BCCH change Notification is detected using the P-RNTI at a predetermined detection timing of the BCCH change based on the BCCH change detection cycle.

As described above, by detecting the BCCH change Notification at a predetermined detection timing based on the BCCH change detection cycle when the group to which the user equipment (UE) terminal $100_n$ belongs is designated (specified) in the P-RNTI, without detecting the BCCH change Notification at all the timings when the Physical Downlink Control Channel (PDCCH) is input by the receiving RF section 102, the power consumption required for detecting the BCCH change Notification may be reduced, thereby saving the battery power. Further, when the BCCH change Notification is detected, by not determining whether BCCH change Notification is detected during the BCCH re-reception process suspension period even when the group to which the user equipment (UE) terminal $100_n$ belongs is designated (specified) in the P-RNTI in the Physical Downlink Control Channel (PDCCH), the number of re-reception process of detecting (receiving) the broadcast information having similar content may be reduced.

Upon inputting (receiving) the C-RNTI corresponding to the user equipment (UE) terminal $100_n$ from the MAC processing section 104, the RRC processing section 106 receives the transport format and the resource block position information included in the Physical Downlink Control Channel (PDCCH) and performs the re-reception of the Physical Downlink Shared Channel (PDSCH) based on the received transport format and the resource block position information. Further, when determining that the BCCH change Notification is detected based on the BBC change notification determination result input by the MAC processing section 104, the RRC processing section 106 performs the re-reception of the broadcast information. To that end, for example, the re-reception of the broadcast information may be performed based on an instruction included in the Physical Downlink Control Channel (PDCCH) addressed to the P-RNTI. Otherwise, first, the Physical Downlink Control Channel (PDCCH) addressed to the P-RNTI may be received; the Physical Downlink Shared Channel (PDSCH) addressed by the Physical Downlink Control Channel (PDCCH) may be received; and the re-reception of the broadcast information may be performed based on an instruction included in the Physical Downlink Shared Channel (PDSCH).

Further, the RRC processing section 106 may notify the MAC processing section 104 of the detection timing of detecting the BCCH change Notification determined based on the BCCH change detection cycle. In this case, the MAC processing section 104 determines whether the BCCH change Notification is detected using the P-RNTI based on of the received detection timing of detecting the BCCH change Notification. Based on the BBC change notification determination result input by the MAC processing section 104, when determining that the BCCH change Notification is detected, the RRC processing section 106 performs the re-reception of the broadcast information. The RRC processing section 106, however, does not notify the MAC processing section 104 of the detection timing of detecting the BCCH change Notification during the BCCH re-reception process suspension period even at the predetermined detection timing based on the BCCH change RNTI cycle. To that end, for example, during the BCCH re-reception process suspension period, the RRC processing section 106 starts a timer to suspend the process of notifying the MAC processing section 104 of the detection timing of detecting the BCCH change Notification based on the BCCH change cycle.

In the above embodiments of the present invention, a case is described where the present invention is applied to Evolved UTRA and UTRAN (a.k.a. Long term Evolution or Super 3G) system. However, the present invention is not limited this configuration. For example, the present invention may also be applied to any user equipment (UE) terminal and a radio communication system capable of transmitting the information item(s) (notification) indicating the change of the broadcast control information of the user equipment (UE) terminal, the broadcast control information corresponding to the notification of the change of the broadcast control information from the network, and changing the broadcast control information based on the notification of the change of the broadcast control information.

To promote an understanding of the present invention, the specific values are used as examples throughout the description. However, it should be noted that such specific values are just sample values only unless otherwise described, and any other adequate values may be alternatively used.

The present invention is described above by referring to specific embodiments. However, a person skilled in the art may understand that the above embodiments are described for illustrative purpose only and may think of examples of various modifications, transformations, alterations, changes and the like. For illustrative purposes, the apparatus according to an embodiment of the present invention is described with reference to the functional block diagram. However, such an apparatus may be provided by hardware, software, or a combination thereof. The present invention is not limited to the embodiments described above, and various modifications, transformations, alteration, exchanges, and the like may be made without departing from the scope and spirit of the present invention.

The present application is based on and claims the benefit of priority of Japanese Patent Application No. 2007-245927, filed on Sep. 21, 2007, the entire contents of Japanese Patent Application No. 2007-245927 are hereby incorporated herein by reference.

The invention claimed is:

1. A user equipment terminal transmitting and receiving broadcast information based on broadcast information change notification notified by a base station apparatus, the user equipment terminal comprising:
a determination unit configured to receive a Broadcast Control Channel (BCCH) change Radio Network Temporary Identity (RNTI) transmitted from the base station apparatus and determine whether the broadcast information has been changed based on the BCCH change RNTI; and
a broadcast information re-reception unit configured to perform re-reception of the broadcast information when the broadcast information has been changed based on a result of determination by the determination unit, wherein
the broadcast information re-reception unit is configured to, when the broadcast information has been changed, perform the re-reception of the broadcast information after a predetermined re-reception process suspension period, during which a process of the re-reception of the broadcast information is suspended, has passed,
wherein the predetermined re-reception process suspension period is started when the determination unit determines that the broadcast information has been changed, and
wherein the determination unit is configured not to detect the broadcast information during the predetermined re-reception process suspension period even at predetermined timings when the broadcast information is to be detected.

2. The user equipment terminal according to claim 1, wherein
the determination unit determines whether the broadcast information has been changed every predetermined period equal to or shorter than the re-reception process suspension period.

3. The user equipment terminal according to claim 1, wherein
the re-reception process suspension period is determined based on a discontinuous reception cycle.

4. The user equipment terminal according to claim 1, wherein
the determination unit receives a Physical Downlink Control Channel (PDCCH) including Broadcast Control Channel-change-Radio Network Temporary Identity (BCC-change-RNTI) from the base station apparatus and determines whether the broadcast information has been changed based on information included in the Physical Downlink Control Channel (PDCCH).

5. The user equipment terminal according to claim 4, wherein
the broadcast information re-reception unit performs the re-reception of the broadcast information based on the information included in the Physical Downlink Control Channel (PDCCH).

6. The user equipment terminal according to claim 1, wherein
the determination unit receives a Physical Downlink Control Channel (PDCCH) including Broadcast Control Channel-change-Radio Network Temporary Identity (BCC-change-RNTI) from the base station apparatus, receives a Physical Downlink Shared Channel (PDSCH) designated by the Physical Downlink Control Channel (PDCCH), and determines whether the broadcast information has been changed based on information included in the Physical Downlink Shared Channel (PDSCH).

7. The user equipment terminal according to claim 6, wherein
the broadcast information re-reception unit performs the re-reception of the broadcast information based on the information included in the Physical Downlink Shared Channel (PDSCH).

8. A user equipment terminal transmitting and receiving broadcast information based on broadcast information change notification notified by a base station apparatus, the user equipment terminal comprising:
a determination unit configured to receive a Physical Downlink Control Channel (PDCCH) including Paging Radio Network Temporary Identity (P-RNTI) from the base station apparatus and determine whether the broadcast information has been changed based on information included in the Physical Downlink Control Channel (PDCCH); and
a broadcast information re-reception unit configured to perform re-reception of the broadcast information when the broadcast information has been changed based on a result of determination by the determination unit, wherein the broadcast information re-reception unit is configured to, when the broadcast information has been changed, perform the re-reception of the broadcast information after a predetermined re-reception process suspension period, during which a process of the re-reception of the broadcast information is suspended, has passed, wherein the predetermined re-reception process suspension period is started when the determination unit determines that the broadcast information has been changed, and wherein the determination unit is configured not to detect the broadcast information during the predetermined re-reception process suspension period even at predetermined timings when the broadcast information is to be detected.

9. The user equipment terminal according to claim 8, wherein the broadcast information re-reception unit performs the re-reception of the broadcast information based on the information included in the Physical Downlink Control Channel (PDCCH).

10. A user equipment terminal transmitting and receiving broadcast information based on broadcast information change notification notified by a base station apparatus, the user equipment terminal comprising:

a determination unit configured to receive a Physical Downlink Control Channel (PDCCH) including Paging Radio Network Temporary Identity (P-RNTI) from the base station apparatus, receives a Physical Downlink Shared Channel (PDSCH) designated by the Physical Downlink Control Channel (PDCCH), and determine whether the broadcast information has been changed based on information included in the Physical Downlink Control Channel (PDCCH); and a broadcast information re-reception unit configured to perform re-reception of the broadcast information when the broadcast information has been changed based on a result of determination by the determination unit, wherein the broadcast information re-reception unit is configured to, when the broadcast information has been changed, perform the re-reception of the broadcast information after a predetermined re-reception process suspension period, during which a process of the re-reception of the broadcast information is suspended, has passed, wherein the predetermined re-reception process suspension period is started when the determination unit determines that the broadcast information has been changed, and wherein the determination unit is configured not to detect the broadcast information during the predetermined re-reception process suspension period even at predetermined timings when the broadcast information is to be detected.

11. The user equipment terminal according to claim 10, wherein the broadcast information re-reception unit performs the re-reception of the broadcast information based on the information included in the Physical Downlink Shared Channel (PDSCH).

* * * * *